United States Patent
Sirohey et al.

(10) Patent No.: US 7,574,032 B2
(45) Date of Patent: Aug. 11, 2009

(54) METHOD AND APPARATUS FOR VIRTUAL SUBTRACTION OF STOOL FROM REGISTRATION AND SHAPE BASED ANALYSIS OF PRONE AND SUPINE SCANS OF THE COLON

(75) Inventors: Saad Ahmed Sirohey, Pewaukee, WI (US); Gopal B. Avinash, Menomonee Falls, WI (US)

(73) Assignee: General Electric Company, Schenectady, NY (US)

( * ) Notice: Subject to any disclaimer, the term of this patent is extended or adjusted under 35 U.S.C. 154(b) by 685 days.

(21) Appl. No.: 11/392,074

(22) Filed: Mar. 29, 2006

(65) Prior Publication Data
US 2006/0215896 A1 Sep. 28, 2006

Related U.S. Application Data

(63) Continuation-in-part of application No. 10/698,701, filed on Oct. 31, 2003, now Pat. No. 7,274,811, and a continuation-in-part of application No. 10/756,872, filed on Jan. 12, 2004, and a continuation-in-part of application No. 10/844,073, filed on May 12, 2004, and a continuation-in-part of application No. 10/709,355, filed on Apr. 29, 2004.

(51) Int. Cl.
*G06K 9/00* (2006.01)
(52) U.S. Cl. ...................................... 382/131
(58) Field of Classification Search ................ 382/128, 382/131, 154; 378/5; 600/117
See application file for complete search history.

(56) References Cited

U.S. PATENT DOCUMENTS

| | | | |
|---|---|---|---|
| 6,331,116 B1 | 12/2001 | Kaufman et al. | |
| 6,477,401 B1 | 11/2002 | Johnson et al. | |
| 6,996,205 B2 | 2/2006 | Capolunghi et al. | |
| 7,209,536 B2 * | 4/2007 | Walter et al. | 378/5 |
| 7,224,827 B2 * | 5/2007 | Acar et al. | 382/131 |
| 7,300,398 B2 * | 11/2007 | Chefd'hotel et al. | 600/117 |
| 7,346,209 B2 * | 3/2008 | Gokturk et al. | 382/159 |
| 7,372,988 B2 * | 5/2008 | Yoakum-Stover et al. | 382/154 |

OTHER PUBLICATIONS

Eric Barnes, *VC CAD matches prone and supine imaging data*, www.auntminnie.com (Jun. 28, 2005).
Eric Barnes, *Colon CAD: VC's extra eyes face new challenges*, www.auntminnie.com (Aug. 5, 2005).

* cited by examiner

*Primary Examiner*—Tom Y Lu
(74) *Attorney, Agent, or Firm*—McAndrews, Held & Malloy, Ltd.; Peter J. Vogel; Michael A. Dellapenna

(57) ABSTRACT

Certain embodiments of the present invention provide a system and method for identifying stool particles in virtual dissection data for a colon. A shape classification may be determined for a segmented colon by three-dimensional filtering of a prone data set and a supine data set. The shape classification may be mapped onto a prone virtual dissection image and a supine virtual dissection image. The prone data set and the supine data set may be registered using one-dimensional registration to determine a registration. Shapes may be localized based on the shape classification and the registration for the prone virtual dissection and the supine virtual dissection. A distance metric may be applied to the localized shapes to identify stool particles. The identified stool particles may be suppressed. A prone virtual dissected image and a supine virtual dissected image may be displayed having the stool particles suppressed.

20 Claims, 7 Drawing Sheets

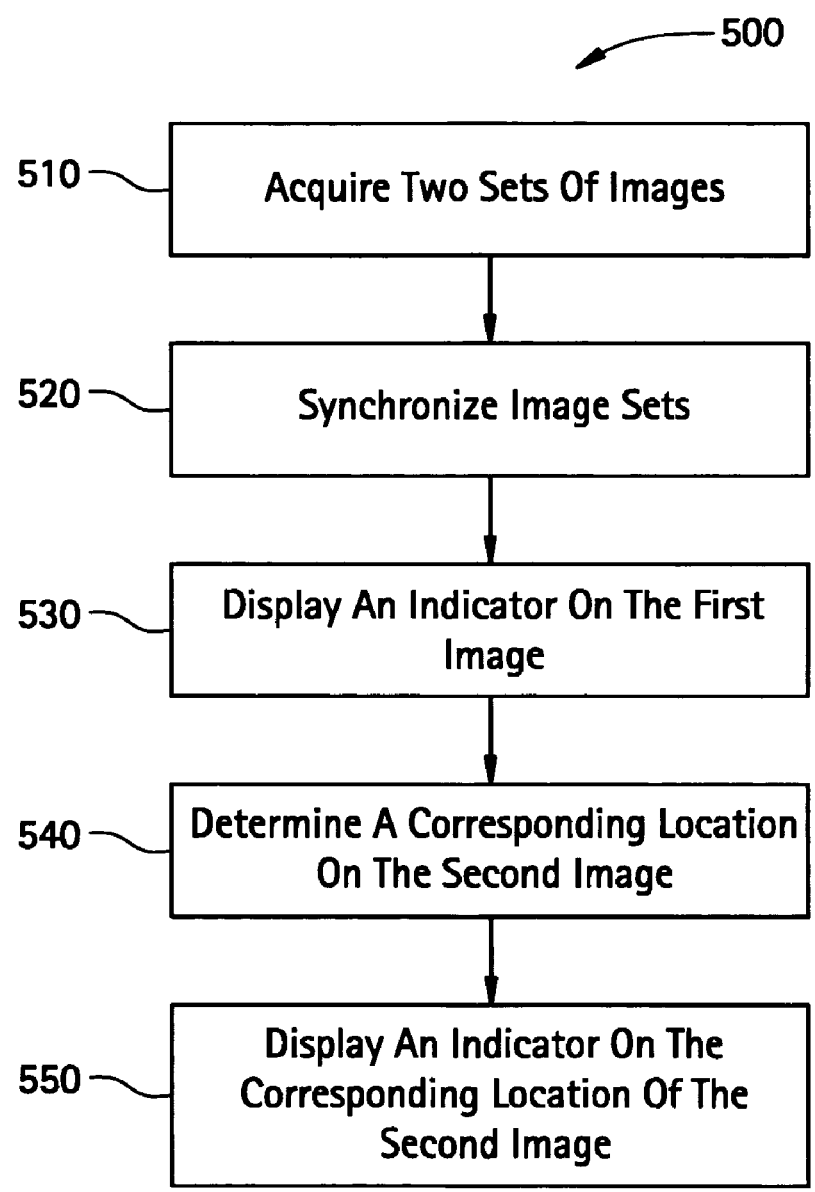

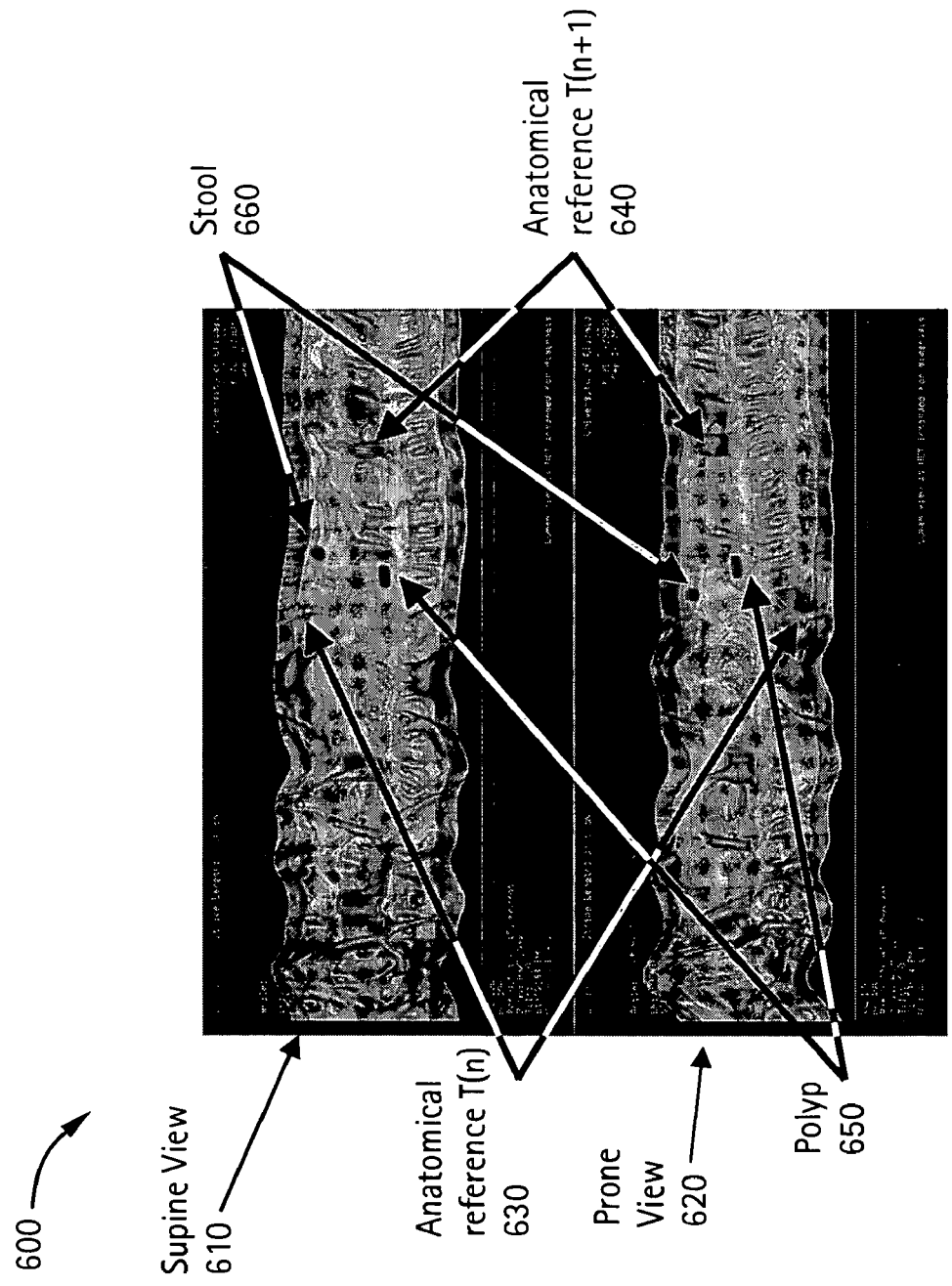

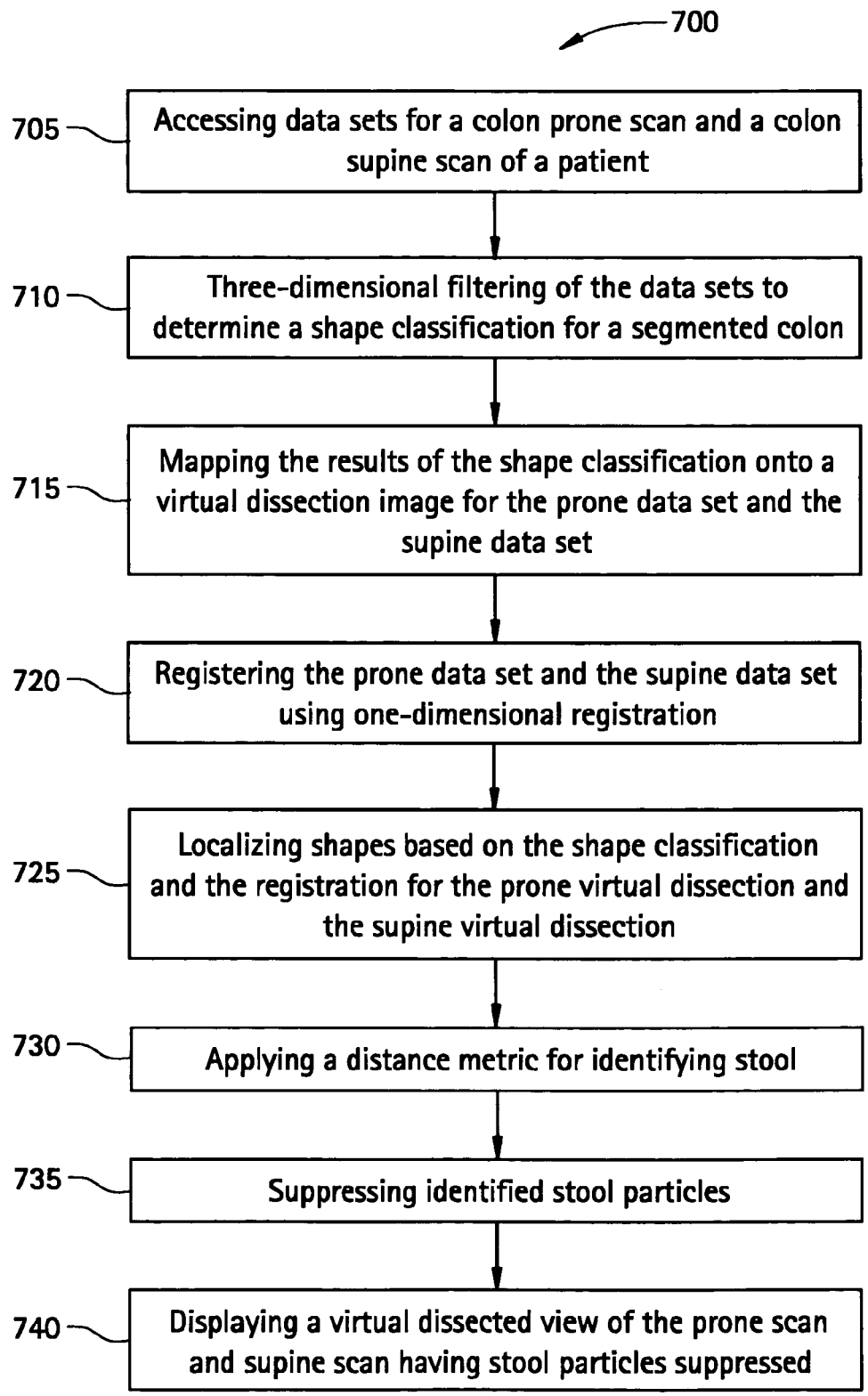

METHOD AND APPARATUS FOR VIRTUAL SUBTRACTION OF STOOL FROM REGISTRATION AND SHAPE BASED ANALYSIS OF PRONE AND SUPINE SCANS OF THE COLON

RELATED APPLICATIONS

This application is a continuation-in-part of the following United States Patent Application Publication Nos., each of which is hereby incorporated by reference in their entirety: 2005/0094858 (application Ser. No. 10/698,701) entitled, "Method And Apparatus For Synchronizing Corresponding Landmarks Among A Plurality Of Images", filed Oct. 31, 2003 now U.S. Pat. No. 7,274,811; 2005/0152587 (application Ser. No. 10/756,872) entitled, "System And Method For Overlaying Color Cues On A Virtual Representation Of An Anatomical Structure", filed Jan. 12, 2004; 2005/0256399 (application Ser. No. 10/844,073), entitled, "Methods For Suppression Of Items And Areas Of Interest During Visualization", filed May 12, 2004; 2005/0244042 (application Ser. No. 10/709,355) entitled "Filtering And Visualization Of A Multidimensional Volumetric Dataset", filed Apr. 29, 2004. This application hereby incorporates by reference in its entirety U.S. Pat. No. 6,996,205, entitled, "Methods And Apparatus To Facilitate Review Of CT Colonography Exams", filed Dec. 22, 2003, related to Provisional application No. 60/482,038, filed on Jun. 24, 2003.

FEDERALLY SPONSORED RESEARCH OR DEVELOPMENT

[Not Applicable]

MICROFICHE/COPYRIGHT REFERENCE

[Not Applicable]

This application is a continuation-in-part of the following United States Patent Application Publication Nos., each of which is hereby incorporated by reference in their entirety: 2005/0094858 (application Ser. No. 10/698,701) entitled, "Method And Apparatus For Synchronizing Corresponding Landmarks Among A Plurality Of Images", filed Oct. 31, 2003; 2005/0152587 (application Ser. No. 10/756,872) entitled, "System And Method For Overlaying Color Cues On A Virtual Representation Of An Anatomical Structure", filed Jan. 12, 2004; 2005/0256399 (application Ser. No. 10/844,073), entitled, "Methods For Suppression Of Items And Areas Of Interest During Visualization", filed May 12, 2004; 2005/0244042 (application Ser. No. 10/709,355) entitled "Filtering And Visualization Of A Multidimensional Volumetric Dataset", filed Apr. 29, 2004. This application hereby incorporates by reference in its entirety U.S. Pat. No. 6,996,205, entitled, "Methods And Apparatus To Facilitate Review Of CT Colonography Exams", filed Dec. 22, 2003, related to Provisional application No. 60/482,038, filed on Jun. 24, 2003.

BACKGROUND OF THE INVENTION

The present invention generally relates to a system and method for automatic image processing of multiple images of an object. In particular, the present invention relates to a system and method for synchronizing corresponding locations among multiple images of an object.

Medical diagnostic imaging systems encompass a variety of imaging modalities, such as x-ray systems, computerized tomography (CT) systems, ultrasound systems, electron beam tomography (EBT) systems, magnetic resonance (MR) systems, and the like. Medical diagnostic imaging systems generate images of an object, such as a patient, for example, through exposure to an energy source, such as x-rays passing through a patient, for example. The generated images may be used for many purposes. For instance, internal defects in an object may be detected. Additionally, changes in internal structure or alignment may be determined. Fluid flow within an object may also be represented. Furthermore, the image may show the presence or absence of objects in an object. The information gained from medical diagnostic imaging has applications in many fields, including medicine and manufacturing.

One particular application for the information acquired from medical diagnostic imaging is in the diagnosis and treatment of cancer. Although there are many different kinds of cancer, they all share a common cause: an uncontrollable growth of abnormal cells. As most cancer cells grow and accumulate, they form a tumor. Medical diagnostic imaging allows various sections of the human body to be examined for cancerous cells and tumors.

A particular type of medical diagnostic imaging used in detecting cancerous growths is tomographic reconstruction. Tomographic reconstruction reconstructs tomographic images for two-dimensional and three-dimensional image scans. Tomographic reconstruction reconstructs an image from image data projections (such as x-ray projections) generated in an image acquisition system. Data from multiple projections are combined to produce an image representing an object. Often, two-dimensional slices are reconstructed from scans of a three-dimensional object. The two-dimensional slices may be combined to construct a three-dimensional image. These two or three dimensional images may be viewed by a physician, or other health care practitioners, in search of cancerous growths, for example.

However, not all forms of cancerous growths are easily detected using tomographic reconstruction. One such area is that of colorectal cancer. Excluding skin cancers, colorectal cancer is the third most common cancer diagnosed in both men and women in the United States. The American Cancer Society estimates that about 105,500 new cases of colon cancer (49,000 men and 56,500 women) and 42,000 new cases of rectal cancer (23,800 men and 18,200 women) will be diagnosed in 2003. Colorectal cancer is expected to cause about 57,100 deaths (28,300 men and 28,800 women) during 2003.

Colorectal cancers are thought to develop slowly over a period of several years. Most colorectal cancers begin as a polyp, a mass of tissue that grows into the center of the tube that makes up the colon or rectum. Once a cancer forms in these polyps, the cancer may grow into the center of the colon or rectum. The cancerous polyp will also grow into the wall of the colon or rectum where the cancer cells may grow into blood vessels. From these vessels, the cancer cells may then break away, spreading to other parts of the body.

Although colon cancer is the third most common cancer diagnosed and the second largest cause of cancer related death in the United States, it has been estimated that up to ninety percent of colon cancers may be prevented. Colonic polyps develop slowly and may take years before becoming cancerous. If polyps are found early, they may be removed before they develop into cancer, or if they are already cancerous, they may be removed before the cancer spreads. Thus, the one of the keys to preventing colon cancer is screening for potential cancerous polyps. The importance of screening is further magnified because most colonic polyps do not produce any symptoms, and nearly seventy-five percent of people who develop colon cancer have no risk factors for the disease, yielding no warning for the onset of cancer.

The American Cancer Society recommends that every person over the age of fifty be screened for colon cancer. They estimate, that if everyone were tested, tens of thousands of lives could be saved each year. However, although colon cancer is the second largest cause of cancer related death, only forty percent of Americans who are at risk for the disease are currently screened as recommend. So few individuals are screened because people typically find the screening methods for colon cancer distasteful. For example, one screening method calls for testing the stool for blood. The blood screening method requires patients to collect stool samples at home to send to the doctor's office for testing. Another screening method, a colonoscopy, involves a bowel cleansing process which lasts about a day, followed by sedation and an examination of the colon with a five-foot-long probe. Due to the time consuming and invasive nature of a colonoscopy, many people choose not to have the colonoscopy.

Tomographic reconstruction of a colon has been advocated as a promising technique for providing mass screening for colorectal cancer. Tomographic reconstruction of a colon is often called a computed tomography colonography (CTC), also called a virtual colonoscopy. A virtual colonoscopy is a technique for detecting colorectal neoplasms by using a computed tomography (CT) scan of a cleansed and air-distended colon. The CTC scan typically involves two CT scans of the colon, a prone scan and a supine scan. A prone scan may include a patient lying face down, for example. Moreover, a supine scan may include a patient lying face up, for example. Both the prone and supine scans capture hundreds of images of a patient's abdomen forming a prone and supine image set. Each image is captured in 20-30 seconds, for example, which translates into an easier, more comfortable examination than is available with other screening tests. Usually, a CTC takes approximately ten minutes, and a person may return to work the same day. Thus, a system and method providing a quick, effective and friendly screening process would be highly desirable. There is a need for a method and system that increases early detection of cancerous polyps and other materials.

However, currently CTC is not a practical clinical tool for colon cancer screening. For CTC to be a practical procedure of screening for colon cancers, a technique should reduce the time for interpreting a large number of images in a time-effective fashion, and for detecting polyps and masses with high accuracy. Currently, however, interpretation of an entire CTC examination is time consuming. A typical CTC examination produces 150-300 axial CT images for each the supine and prone image sets, yielding a total of 300-700 images/patient. Studies show that a case interpretation time per patient is between 15 and 40 minutes even when the reading is done by experts in abdominal imaging. Thus a system and method that reduces CTC case interpretation time would be highly desirable.

In addition, the diagnostic performance of CTC currently remains vulnerable to perceptual errors. Several studies have reported a relatively low sensitivity, 40%-70%, for example, in the detection of polyps using a CTC examination. A low detection rate may result from the system and method used to display and view the images. Thus, an improved system and method used to display and view the images may improve the detection of cancerous growths.

As previously mentioned, a CTC examination involves two scans: a prone scan and a supine scan. Multiple scans may be obtained due to the elastic structure of the colon. That is, the colon is a flexible structure, much like an accordion, that changes shape based on body position. Portions of the colon that are visible in a prone view, may not be visible in a supine view, and vice versa, for example. Thus, in order to have an accurate representation of the colon, both a prone and supine scan should be conducted.

Another reason that performing two scans of the colon provides a more accurate representation than a single scan is that even though pre-exam procedures call for a bowel cleansing process, excess liquid or residual fecal matter within the colon may still be lingering during the exam. Because the excess material has a tendency to shift between a prone image set and a supine image set, target items or potential polyps may be observable in one image set and obscured in the other. Hence, both image sets must be compared and contrasted during a CTC case interpretation.

Often, both the prone and supine image sets are compared and contrasted simultaneously. Ideally, a particular portion of the colon in one set is searched for polyps, and then the corresponding portion of the colon in the second set is also reviewed for polyps. Each potential growth or polyp is scrutinized to determine whether it actually is a polyp or simply excess material. One method to distinguish excess material from a polyp is to compare corresponding locations of the colon in both the prone and supine image sets. Because the excess material tends to shift between a prone and supine image scan, the excess material seen in a particular location in one image set will usually be in a different location in the corresponding image set. However, polyps typically do not change location between the image sets. Thus, if a growth is in a particular location of the colon in both image sets, the growth may be a potential polyp.

Observing a similar growth in corresponding locations of the colon in both the prone and supine image sets facilitates a comparison analysis. Current systems and methods for viewing CTC prone and supine image sets do not link the image sets together. Unlinked images may create difficulty for a user when determining whether or not corresponding locations in the prone and supine image sets are being viewed. Hence, the user currently guesses if the portion of the colon being viewed in the prone image set is the same portion of the colon being viewed in the supine image set.

Guessing whether the portion of the colon being viewed in the prone image set is the same portion of the colon being viewed in the supine image set is very time consuming due to the manual, imprecise nature of the analysis. Forcing a user to guess at colon location accounts for an extremely long CTC case interpretation time per patient. A user spends a significant amount of time ascertaining whether the user is viewing corresponding locations of the colon in each of the prone and supine views. Even if a user thinks the user is viewing two corresponding locations of a colon, currently the user may not be certain. As is explained above, a long CTC case interpretation time currently makes clinical screening impracticable.

Also, rough estimation of corresponding locations provides for a highly inaccurate procedure for distinguishing excess material from potential cancerous growths or other objects. The low detection rate of detecting polyps using a CTC examination mentioned above is partially caused by a user's inability to determine whether the user is viewing corresponding locations of the colon in prone and supine views. As is explained above, the low detection rate currently makes clinical CTC screening impracticable.

Therefore, a need exists for a system and method which automatically synchronizes corresponding locations of an object among multiple images. Such a system and method may be used to synchronize corresponding locations of prone and supine image sets of a CTC examination, for example, thereby reducing CTC case interpretation time and increasing detection rate of potentially cancerous polyps.

SUMMARY OF THE INVENTION

Certain embodiments of the present invention provide a system and method for automatically synchronizing corresponding locations of an object and indicators among multiple images. In an embodiment of the invention, the acquired images are converted into one dimensional digital profile maps. Next, a common reference point among the images is identified. Next, various landmarks are then identified in the one dimensional digital profile maps. The landmarks are then equated to determine the corresponding landmarks among the plurality of images, as well as the corresponding landmarks location from the reference point and the corresponding landmarks location from each other. Finally, information regarding the corresponding landmarks and the corresponding landmarks respective distances is registered.

In an embodiment of the invention, a method involves viewing a plurality of images with corresponding landmarks and corresponding indicators. The method may obtain at least one image of an object for a first image set and at least one image of the object for a second image set. Then, corresponding landmarks are synchronized between the first image set and the second image set. Next, the method includes displaying a first indicator at a first location on a first displayed image from the first image set. Then, the second image set is searched for a location corresponding to the first location in the first image set. Finally, the second displayed image of the object from the second image set is displayed along with a second indicator corresponding to the first indicator.

In an embodiment of the invention, a system synchronizes corresponding landmarks and indicators among a plurality of images of an object. The system comprises a dimensional converter unit for use in creating one dimensional digital profile maps of the images based on two or three dimensional digital representations of the object. The system also comprises a reference point identification unit for use in identifying a common reference point among all the images. Moreover, the system comprises a landmark identification unit for use in identifying landmarks in the one dimensional digital profile maps. Also, the system comprises a correlation unit for use in equating corresponding landmarks among the images, as well as computing the corresponding landmarks distances from the reference point and the corresponding landmarks distances from each other. Finally, the system comprises a registration unit for use in registering the corresponding landmarks as well as the respective distances among each one dimensional digital profile map.

The method and apparatus of the invention allows a synchronization of images of multiple perspectives of the same object using corresponding landmarks. Synchronization ensures an observer is viewing a same portion of an object, and allows an indicator to identify a particular location of the same object, even when viewing different perspectives. For example, a particular application of an embodiment of the invention may be used to synchronize corresponding locations and indicators of the prone and supine images of a CTC examination, thereby reducing the CTC case interpretation time and increasing the detection rate of potentially cancerous polyps. Such improvements in CTC examination capabilities increase the possibility of using a CTC examination for large scale screening for colonic polyps, and other identification operations, for example.

Certain embodiments of the present invention include a method for suppressing stool particles in virtual data for a colon. The method may include accessing a prone data set and a supine data set. The method may also include three-dimensional filtering of a prone data set and a supine data set to determine a shape classification for a segmented colon. Next, mapping the shape classification onto a prone virtual dissection image and a supine virtual dissection image. The prone data set and the supine data set may be registered by using one-dimensional registration to determine a registration. The shapes may be localized based on the shape classification and the registration for the prone virtual dissection and the supine virtual dissection. A distance metric may be applied to the localized shapes to identify stool particles. The identified stool particles may be suppressed. Finally, a prone virtual dissected image and a supine virtual dissected image may be displayed.

In an embodiment of the present invention, the colon may be prepped. Also, the three-dimensional filtering may be performed using a Curvature tensor filter. The results of the three-dimensional filtering are a description of local shape characteristics. The step of localizing shapes may include localizing shapes indicative of anatomical landmarks in the colon. Also, the distance metric may include determining the distance between the location of a spherical shape in the prone virtual dissection image and the corresponding location of the spherical shape in the supine virtual dissection image with reference to the localization. If the distance between the location of a spherical shape in the prone virtual dissection image and the corresponding location of the spherical shape in the supine virtual dissection image is greater than a predetermined threshold value, classifying the spherical shape as stool.

Certain embodiments of the present invention also include a computer-readable storage medium including a set of instructions for a computer. The set of instructions includes an accessing routine for accessing a prone data set and a supine data set. The set of instructions also includes a three-dimensional filtering routine for three-dimensional filtering of a prone data set and a supine data set to determine a shape classification for a segmented colon. The set of instructions also includes a mapping routine for mapping the shape classification onto a prone virtual dissection image and a supine virtual dissection image. The set of instructions also includes a registration routine for registering the prone data set and the supine data set using one-dimensional registration to determine a registration. The set of instructions also includes a localization routine for localizing shapes based on the shape classification and the registration for the prone virtual dissection and the supine virtual dissection. The localizing routine may include localizing shapes indicative of anatomical landmarks in the colon. The set of instructions also includes a distance metric routine for applying a distance metric to the localized shapes to identify stool particles. The set of instructions also includes a suppression routine for suppressing identified stool particles. The set of instructions also includes a display routine for displaying a prone virtual dissected image and a supine virtual dissected image.

BRIEF DESCRIPTION OF THE DRAWINGS

FIG. 5 illustrates a flow diagram for a method for viewing a plurality of images with corresponding landmarks used in accordance with an embodiment of the present invention.

FIG. 6 illustrates a supine virtually dissected view of a human colon and a prone virtually dissected view of a human colon.

FIG. 7 illustrates a flow diagram for identifying and subtracting stool particles from virtual dissection images of a prone and supine data set in accordance with an embodiment of the present invention.

DETAILED DESCRIPTION OF THE INVENTION

Figure 1:
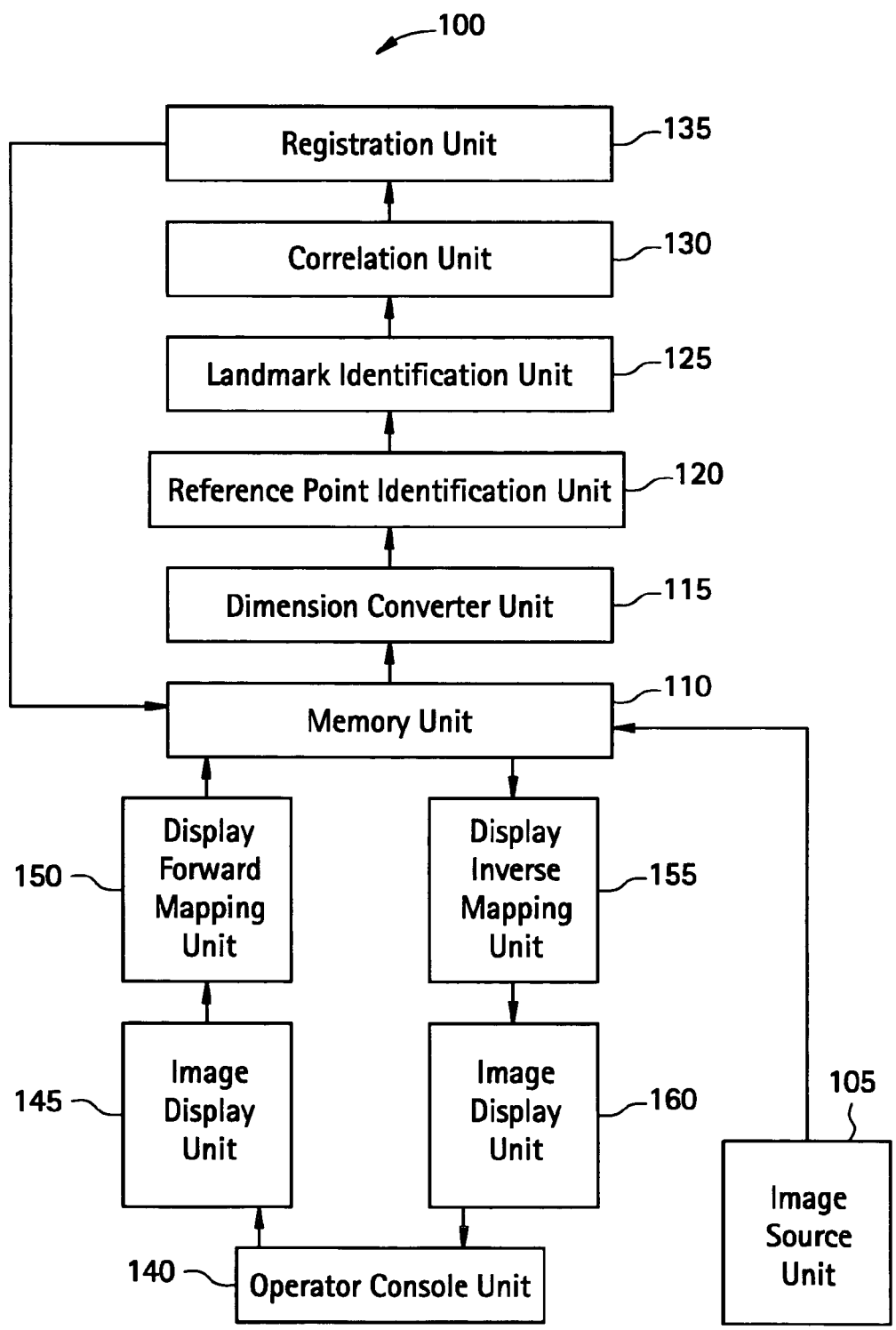
FIG. 1 illustrates an image processing system for synchronizing corresponding landmarks among a plurality of images of an object used in accordance with an embodiment of the present invention.

FIG. 1, illustrates an image processing system 100 used in accordance with an embodiment of the present invention. The system 100 includes an image source unit 105. The image source unit contains a first image set 103 and a second image set 107 (not shown). The system 100 also contains a memory unit 110, a dimension converter unit 115, a reference point identification unit 120, a landmark identification unit 125, a correlation unit 130, a registration unit 135, an operator console 140, an image display unit 145, a display forward mapping unit 150, a display inverse mapping unit 155, and an image display unit 160.

In an embodiment, the system 100 preprocesses image data 103, 107 and then makes the processed image data 103, 107 available for display and navigation by a user. Alternatively, the image data is available for display prior to being processed by the system 100. An image source unit 105 provides the image data 103, 107 for processing to the memory unit 110. The memory unit 110 stores the image data 103, 107. The memory unit 110 communicates with the dimension converter unit 115, the display forward mapping unit 150, the display inverse mapping unit 155, and the registration unit 135. Preprocessed image data 103, 107 is communicated to the dimensional converter unit 115. The dimension converter unit 115 performs operations and communicates with the reference point identification unit 120. The reference point identification unit performs operations and communicates with the landmark identification unit 125. The landmark identification unit performs operations and communicates with the correlation unit 130. The correlation unit 130 performs operations and communicates with the registration unit 135. The registration unit 135 organizes the processed data and communicates with the memory unit 110. The memory unit 110 then communicates the processed image data 103, 107 with the display forward mapping unit 150 and the display inverse mapping unit 155. The display forward mapping unit 150 communicates with the image display unit 145. The display inverse mapping unit 155 communicates with the image display unit 160. The operator console unit 140 interacts with the image display unit 145 and the image display unit 160.

The components of the system 100 may be separate units, may be integrated in various forms, and may be implemented in hardware and/or in software. Particularly, the dimension converter unit 115, the display forward mapping unit 150, and the display inverse mapping unit 155 may be a single unit. Also, multiple image sets may be used. Although FIG. 1 exemplifies an embodiment of the invention that uses two images sets, (a first image set 103 and a second image set 107) the invention itself is not limited to two image sets. Alternatively, multiple images may be taken from a single image set. Moreover, multiple image display units may be used. Although FIG. 1 exemplifies an embodiment of the invention that uses two image display units, the invention itself is not limited to two image sets.

Referring again to FIG. 1, the first image set 103 and second image set 107 may be two images or two collections of images, for example, of the same object from different views. For instance, the first image set 103 may contain one or more images of an object in a first position, and the second image set 107 may contain one or more images of an object in a second position. As an example, the object may be lying on a first side, with a second side facing upward, for a first image set 103, for example. During the second image set 107, the object may be turned over so the object is lying on the second side, with the first side facing upward, for example.

The individual images within the image sets 103, 107 may contain the same parameters or different parameters as the other images within the image set. For explanatory purposes only, the image set may be designed to capture the view of an object as one proceeds around the object in a circular fashion. As an example, an image in the image set may be taken every one degree as images are captured in a 360 degree circle around the object. In this example, 360 images would exist in the image set. Embodiments of the invention are not limited to circular pattern image sets, nor are embodiments of the invention limited to one degree increments within an image set or the degree unit as a measuring point. An image set is a set of images, regardless of whether the set contains one image, or many images.

Images and image sets may be obtained from a variety of sources and methods. As an example, images and image sets may be acquired as either two, three, or four dimensional images. Two dimensional images include a dual vector plane, three dimensional images include a three vector plane, and four dimensional images include a three vector plane and a time component. The imaging equipment may be directly connected to the system 100 or indirectly connected to the system 100. An example of an indirect connection may be imaging equipment connected to an image storage unit, such as a picture archiving and communications system (PACS), which is connected to the system 100 over a data network. Any method and apparatus capable of generating or delivering the images and image sets may be suitable for use with the system 100.

Once acquired by the system 100, the preprocessed first image set 103 and preprocessed second image set 107 are transmitted to the memory unit 110. The memory unit 110 stores two, three, or four (time) dimensional data as provided by the first image set 103 and second image set 107. The stored image sets 103 and 107 may be sent to the display units 145 and 160 for display, or transmitted to the dimension converter unit 115.

In an embodiment of the invention, the dimensional converter unit 115 is a forward dimensionality converter unit. The forward dimensionality converter unit is used to convert the two, three, or four dimensional images of the first image set 103 and the second image set 107 into one dimensional projection profile maps using data projection methods. The data projection method is chosen from a list of methods comprising, median projection, maximum projection, and minimum projection. The provisional U.S. Patent Application No. 60/482,038 entitled "Methods And Apparatus To Facilitate Review Of CT Colonography Exams," to inventors Saad Sirohey, Jerome Knoplioch, Gopal Avinash, Renaud Capolunghi, and Laurent Launay filed on Jun. 24, 2003 is hereby incorporated by reference in its entirety.

Once the dimensional projection profile maps are created for the first image set 103 and the second image set 107, the dimensional profile maps are communicated to the reference point identification unit 120. The reference point identification unit 120 is used to identify a distinct item of the object, common to all image sets, that may be used as a reference point to base calculations upon. In an embodiment, the reference point is a single item that does not deform or change location based upon the object's position.

Alternatively, the first image set 103 and the second image set 107 are communicated to the reference point identification unit 120 before the dimension converter unit 115 operates to create one dimensional profile maps. In an alternative embodiment, the reference point identification unit 120 identifies a reference point in two, three, or four dimensional form. Afterward, the reference point identification unit communicates with the dimension converter unit 115 to create the one dimensional profile maps. One dimensional profile maps may also be stored in the memory unit 110.

Referring again to FIG. 1, the one-dimensional projection profile maps of the first image set 103 and second image set 107 are then transmitted to the landmark identification unit 125. Landmarks are persistent features of an object that may not change based on the position of the object. The landmark identification unit 125 identifies the persistent features of the object in both the one dimensional projection profile map of the first image set 103 and the one dimensional projection profile map of the second image set 107. For example, the landmark identification unit 125 searches the first image set 103 for landmarks. The landmark identification unit 125 locates landmarks A and B, for example, in the first image set 103. The second image set 107 includes images of the same object in a different position than in the first image set 103. The landmark identification unit 125 locates landmarks A and B in the second image set 107. That is, landmarks A and B may represent the same structures of the object viewed in different image sets.

The correlation unit 130 then receives the one dimensional projection profile map of the first image set 103, the one dimensional projection profile map of the second image set 107, the respective landmarks in each image set 103, 107 that were identified by the landmark identification unit 125, and the reference point. The correlation unit 130 compares the landmarks of the first image set 103 with the landmarks of the second image set 107 in search of similar landmarks in each set. As the correlation unit 130 finds similar landmarks, the correlation unit 130 notes a distance of each landmark in each image set from the reference point and a distance between each of the landmarks.

For example, as landmarks A and B in the first image set 103 are identified by the landmark identification unit 125, the correlation unit 130 searches and locates the corresponding landmarks A and B in the second image set 107. A distance from the reference point to landmark A in the first image set 103 and a distance from the reference point to landmark A in the second image set 107 are noted. Additionally, a distance from the reference point to landmark B in the first image set 103 and the distance from a reference point to landmark B in the second image set 107, are noted. The correlation unit 130 locates corresponding landmarks and notes the landmarks respective distances from the reference point. The distance information may also be used to determine distances between landmarks in an image set. Once the distance information for landmark A and landmark B from the reference point are known, the distance from landmark A to landmark B may also be determined.

The information regarding corresponding landmarks between image sets 103, 107 is then transferred to the registration unit 135. The registration unit 135 organizes the corresponding landmarks and the landmark distances from the reference point and from other landmarks. For example, the location of the landmarks A and B in the first image set 103 is recorded, as well as the distance from landmarks A and B to the reference point. The distance between landmark A and landmark B in the first image set 103 is also recorded. Similarly, the location of the landmarks A and B in the second image set 107 is recorded, as well as the distance between landmarks A and B and the reference point. Moreover, the distance between landmark A and landmark B in the second image set 107 is also recorded.

In an embodiment, the registration unit 135 communicates the corresponding organization of locations and distances of the respective landmarks to the memory unit 110. The memory unit 110 stores the corresponding organization of landmarks and their respective locations and distances as one dimensional data.

In an embodiment, once the memory unit 110 has stored the processed image data 103, 107 as received from the registration unit 135, the processed image data 103, 107 is available for display and navigation. As explained above, the image data may be available for display prior to processing. For example, images may be displayed on display units 145, 160 and be refreshed as image data 103, 107 is processed in the system 100. Display of the image data 103, 107 may consist of a whole or partial two, three, or four dimensional display of the object. Moreover, the number of image sets to be displayed does not control the number of display units. Any combination of display units and image sets may be used to implement the invention. The combination in FIG. 1 is only an example.

Navigation of the image data 103, 107 may involve static and/or dynamic images in two dimensional, three dimensional, and/or four dimensional views. The operator console unit 140 may allow a user to set one or more indicators pointing to a particular location or locations of the image displayed. The indicator may be a marking, such as a cursor, on the display units 145, 160 which serves to point to a particular location of the displayed image. The operator console unit 140 may contain a control mechanism, such as a ball control, keyboard, or mouse, for controlling the indicator on the display, for example, but any control mechanism may be used. The operator console unit 140 may also allow a "fly through" of the object. During fly through, partial views of the object are viewed in quick succession to create a video of the images within an image set 103, 107.

In operation, an operator or program may direct a first image from the first image set 103 to be displayed on the image display unit 145 or image display unit 160. Although FIG. 1 illustrates the operator console unit 140 directing only the image display unit 145 to display a first image, the operator console unit 140 may also direct image display unit 160 to display a first image. However, the display unit 145, 160 chosen, to display a first image from a first image set 103 is referred to as the dominant display unit. In an embodiment, the dominant display unit controls the other subservient display units. The choice of which display unit 145, 160 is dominant may be altered at any time during operation of the system 100.

Referring to FIG. 1, a user or computer program may direct the display of image set 103 on image display unit 145 and display of image set 107 on image display unit 160. In FIG. 1, the example provided demonstrates a situation where the operator has chosen image display unit 145 as the dominant display unit. As such, the operator has control over a first indicator on image display unit 145 which points to various locations in image set 103.

An operator may use the first indicator on display unit 145 to point to a location in image set 103. The location of the first indicator is then forward mapped using the forward mapping unit 150. The forward mapping unit creates a one dimensional projection profile of the location of the first indicator in image set 103. The location of the first indicator in image set 103 is then transmitted to the memory unit 110. The corresponding location of the first indicator in image set 107 is located, along with images in image set 107 pertaining to the indicator's location on the object. A second indicator may then point to the corresponding location in image set 107. In an embodiment, the first indicator of image set 103 points to the same location on the object as the second indicator of image set 107.

The image containing the second indicator and the location of the second indicator are then passed to the display inverse mapping unit 155. The display inverse mapping unit 155 is used to convert the one dimensional projection profile maps of the chosen image and indicator location into two, three, or four dimensional image as requested. The inverse dimensionality converter unit 155 further comprises a landmark elasticity measurement unit (not shown) and a matching unit (not shown). The matching unit uses a circular one-dimensional signal correspondence method, such as a maximum correlation measure, a mutual information measure, and a minimum difference measure. The two, three, or four dimensional image and corresponding indicator acquired from image set 107 are then displayed on display unit 160. The image displayed on image display unit 160 from image set 107 corresponds to the image as displayed on image display unit 145 from image set 103. Both displays allow the user to view the same location of the object in two different image sets. Furthermore, the second indicator as displayed in image display unit 160 points to the same location of the object as the first indicator in image display unit 145.

A user may change the location of the dominant indicator or portion viewed on the dominant display unit and the subservient display units may display the corresponding location of the indicator and portion of the object in the respective image sets.

As an example, the system 100 may be used in conducting a computed tomography colonography (CTC) to detect colon cancer. In a CTC, a computed tomography (CT) machine is used to acquire images of the human colon. Two sets of images are acquired, a prone set of images and a supine set of images. A computed tomography machine used to acquire the images may be a local machine or a machine connected to a network in which images may be stored or retrieved. The images are generally two, three, or four dimensional images at acquisition.

Figure 2:
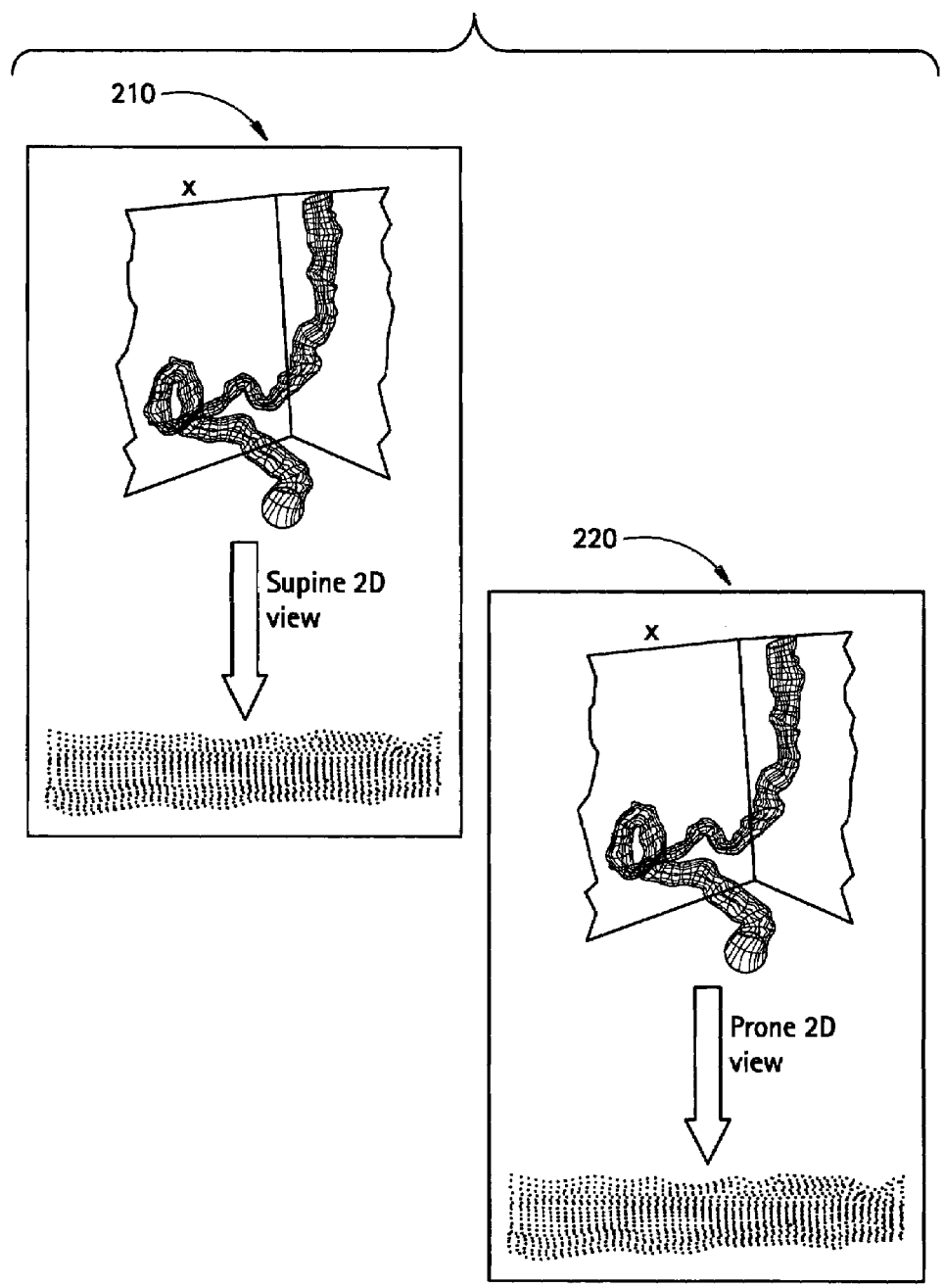
FIG. 2 shows a graphic representation of data used in accordance with an embodiment of the present invention.

FIG. 2 shows a prone and a supine representation of a human colon in accordance with an embodiment of the present invention. A supine image set 210 shows a typical three dimensional and a typical two dimensional representation of a colon from a CT supine scan. A prone image set 220 shows a typical three dimensional and a typical two dimensional representation of a colon from a CT prone scan. The representations are created using multiple images in each image set.

Referring again to FIG. 1, the first image set 103 may be referred to as the supine image set 210 and the second image set 107 may be referred to as the prone image set 220, for example. In an embodiment, the supine image set 210 and the prone image set 220 are communicated to the memory unit 110 from the image source unit 105. The memory unit 110 stores the supine and prone image data 210, 220. The image data 210, 220 is transmitted to the dimension converter unit 115. The dimension converter unit 115 is used to convert the supine image set 210 and the prone image set 220 from two, three, or four dimensional images into one dimensional projection profile maps using data projection methods. The data projection method may be chosen from a list of methods comprising, median projection, maximum projection, and minimum projection.

The supine image set 210 and the prone image set 220 are then transmitted to the reference point identification unit 120. As previously mentioned, the reference point identification unit 120 is used to identify a base point for calculation purposes. In an embodiment, the reference point is a human anus. The anus is an anatomically distinct object that does not substantially deform during transitions between prone and supine views. Hence, the location of the anus should be the same in the prone image set 220 as it is in the supine image set 210, making the location of the anus a usable reference point to conduct calculations in both the prone image set 220 and supine image set 210.

Alternatively, as previously mentioned, the reference point identification unit 120 may receive the supine image set 210 and the prone image set 220 as two, three, or four dimensional data. The reference point identification unit 120 may then find a reference point before the dimension converter unit 115 creates a one dimensional projection profile map.

Referring again to FIG. 1, the one dimensional projection profile maps of the supine image set 210 and the prone image set 220 are then transmitted to the landmark identification unit 125. As explained above, landmarks are persistent features of an object, regardless of the object's position. In an embodiment, the landmarks are folds or polyps of the colon, for example. Even though the colon may change position from the prone to supine views, the folds of the colon generally remain recognizable from the prone to supine views.

Figure 3:
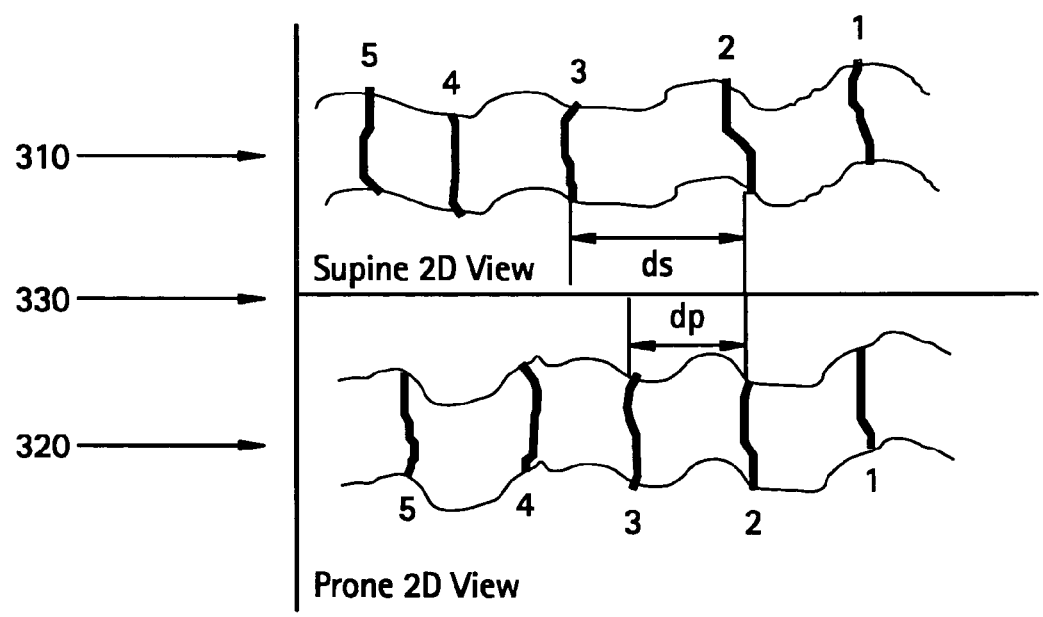
FIG. 3 depicts an explanatory drawing depicting a correspondence of landmarks among the supine and prone views used in accordance with an embodiment of the present invention.

FIG. 3 illustrates an example of the landmarks which may be identified in accordance with an embodiment of the present invention. The supine two dimensional drawing 310 shows landmarks 1, 2, 3, 4, and 5. The prone two dimensional drawing 320 shows landmarks 1, 2, 3, 4, and 5. The reference point 330 is also shown. The landmarks 1, 2, 3, 4, and 5 represent various folds of a colon. The reference point 330 represents an anus, for example.

Referring to FIG. 1, once the landmarks in the supine image set 210 and the prone image set 220 are identified, the image data is transmitted to the correlation unit 130. The correlation unit 130 identifies corresponding landmarks between the prone 220 and supine 210 image sets as well as a relative distance from the reference point to the landmarks and distance between the landmarks. For example, referring to FIG. 3, the prone two dimensional drawing 320 contains landmarks 5, 4, 3, 2, and 1 and the supine two dimensional drawing 310 contains landmarks 5, 4, 3, 2, and 1. The correlation unit identifies that landmark 1 in the prone two dimensional drawing 320 is the same structure of the object as landmark 1 in the supine two dimensional drawing 310. In the example of the colon as the object, the correlation unit 130 recognizes that fold 1 of the prone two dimensional drawing 320 is the same fold of the colon as fold 1 of the supine two dimensional drawing 310.

The correlation unit 130 then measures a distance between landmark 1 in the supine two dimensional drawing 310 and the reference point 330. Similarly, a distance from landmark 1 in the prone two dimensional drawing to the reference point 330 is noted. Next, the correlation unit 130 determines a distance from landmark 1 in the supine two dimensional drawing 310 to landmark 2 in the supine two dimensional drawing 310. Similarly, the correlation unit 130 measures a distance from landmark 1 in the prone two dimensional drawing 320 to landmark 2 in the prone two dimensional drawing 320. The distance between landmarks is called an intra-landmark distance. The intra-landmark distances in FIG. 3 are referred to as ds and dp. The correlation unit 130 determines the location, distance from the reference point 330, and distance between landmarks, for each pair of corresponding landmarks in both the supine and prone image sets 210, 220.

Pairs of landmarks may be correlated even though the landmarks may not be located the same distance from the reference point 330 in each image set. Non-uniform stretching of the colon from the prone and supine positions is demonstrated in FIG. 3. Even though landmarks 3, 4, and 5 of each image set 210, 220 are generally the same structure of the same object, landmarks 3, 4, and 5 of the prone set 220 are different distances from the reference point 330 than landmarks 3, 4, and 5 of the supine image set 210. In FIG. 3, a difference between the distance dp and ds highlights non-uniformity of distance. The relationship between the prone and supine image sets is as follows:

$$xs = xp * dp/ds \quad \text{[Equation 1]},$$

where:
xs=distance in the supine view from the reference point,
xp=distance in the prone view from the reference point,
ds=intra-landmark length of the supine landmarks, and
dp=intra-landmark length of the prone landmarks.

Referring again to FIG. 1, in an embodiment, after the correlation unit 130 determines the location of the corresponding landmarks, the distance from the reference point and the distance between the landmarks is organized in the registration unit 135. The organized information in the registration unit 135 is then transmitted to the memory unit 110. The memory unit 110 stores the processed data.

In an embodiment, an operator or program may direct an indicator to mark a first location of the supine image set 210. The indicator and corresponding portion of the supine image set 210 is displayed on the image display unit 145. The location of the selected indicator and portion of the supine image set 210 are then transmitted to the display forward mapping unit 150. The display forward mapping unit 150 creates a one dimensional projection profile of the selected location. The memory unit 110 is then searched for the landmarks in the prone image set 220 corresponding to the landmarks of the one dimensional projection profile of the supine image set 210. Once the corresponding landmarks in the prone image set 220 are found, the landmarks, the image in which the landmarks reside, and the location of the indicator are transmitted to the display inverse mapping unit 155.

The display inverse mapping unit 155 is then used to convert the one dimensional projection profile maps information onto two, three, or four dimensional images using a landmark elasticity measurement unit and a matching unit. The matching unit uses a circular one-dimensional signal correspondence method, such as a maximum correlation measure, a mutual information measure, and a minimum difference measure, to match one dimensional data to a two, three, or four dimensional representation.

A second image is then displayed on the image display unit 160 with an indicator corresponding to the location of the indicator on the image display unit 145. Hence, both the image display unit 145 and the image display unit 160 display the same portion of the colon. Moreover, the indicator of the display unit 145 points to the same location of the colon as the indicator of the display unit 160. Alternatively, image display unit 145 may display the prone view of the colon, and image display unit 160 may display the supine view of the colon, for example. Alternatively, as mentioned above, both the prone and supine views may be displayed on a single display unit.

Figure 4:
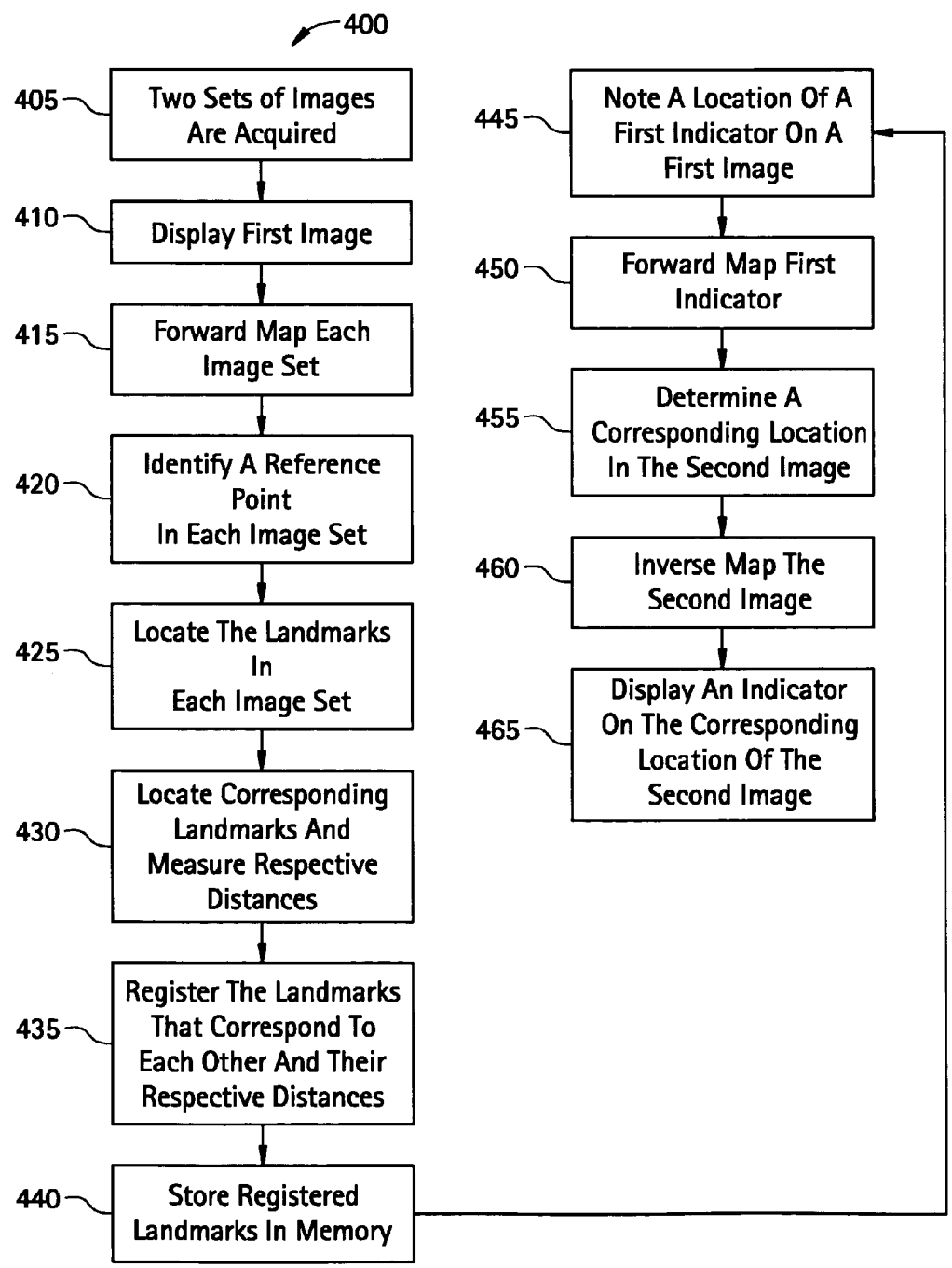
FIG. 4 illustrates a flow diagram for a method for synchronizing corresponding landmarks among a plurality of images of an object in accordance with an embodiment of the present invention.

FIG. 4 illustrates a flow diagram for a method 400 for synchronizing corresponding landmarks among a plurality of images of an object in accordance with an embodiment of the present invention. First, at step 405, at least two sets of images are acquired. Next, at step 410, a first image set is displayed. Then, at step 415, a one dimensional digital profile forward map of the sets of image data is created. At step 420, a reference point in each image set is located. Next, at step 425, the landmarks in each image set are located. At step 430, the corresponding landmarks among the image sets are located to determine which landmarks in one image set correspond to landmarks in other image sets. Also at step 430, the respective distances of landmarks from the reference point and the distances between landmarks are calculated. At step 435, the corresponding landmarks and distances may be registered. Then, at step 440, the landmarks and distance data are stored in memory. At step 445, the location of a first indicator on a first image is noted. Next, at step 450, the first indicator is forward mapped to create a one dimensional projection profile of the first indicator. At step 455, the corresponding location of the first indicator in the second image is found. At step 460, the image or image set containing the corresponding location to the first indicator is inverse mapped to create a two, three, or four dimensional image. Finally, at step 465, a second image is displayed containing a second indicator identifying a same location of an object as the first indicator identifies in the first image. Each of these steps is described in more detail below.

In an embodiment, the method 400 may be used to synchronize corresponding landmarks between a prone and supine computed tomography colonography (CTC) scan. As previously discussed, in a CTC scan, two sets of images of the human colon, for example, are acquired, a prone set of images and a supine set of images.

At step 405, images are acquired. The first image set may be a supine image set 210, and the second image set may be a prone image set 220, for example. After the supine image set 210 and the prone image set 220 are acquired, at step 410, a first image set is displayed. The first image set may be either the supine image set 210 or the prone image set 220, for example.

At step 415, the supine 210 and prone 220 image sets are forward mapped from two, three, or four dimensional data into one dimensional projection profile maps. Representing image data as a one dimensional projection profile map allows the data to be processed and landmarks and other image characteristics to be more easily identified. In an embodiment, the supine 210 and prone 220 image sets are forward mapped to convert the two, three, or four dimensional images of the supine 210 and the prone 220 image sets into one dimensional projection profile maps using data projection methods. The data projection method is chosen from a list of methods comprising, median projection, maximum projection, and minimum projection.

After the one dimensional projection profile maps of the supine 210 and prone 220 image sets are created, a reference point 330 in each image set is located. As previously mentioned, the reference point 330 is used to identify a base point for calculation purposes. In an embodiment, the reference point 330 is a human anus. The anus is an anatomically distinct object that may not deform during transitions between prone and supine views. Hence, the location of the anus should be the same in the prone image set 220 as it is in the supine image set 210, making the location of the anus a usable reference point 330 to conduct calculations in both the prone image set 220 and supine image set 210.

Alternatively, the reference point 330 may be located in the supine image set 210 and the prone image set 220 as two, three, or four dimensional data. In this alternative embodiment, the reference point 330 among the image sets is located before the data is forward mapped to create a one dimensional digital profile. Referring to FIG. 4, in an alternative embodiment, step 415 and 420 could be toggled At step 425, landmarks are located in both the supine and prone image sets 210, 220. As previously mentioned, landmarks are features of an object that may not change based on the position of the object. Landmarks may be the folds of the colon, for example. Even though the colon may change position from the prone to supine views, the folds of the colon may not change. The location of the folds in each of the supine and prone image sets with respect to from the reference point 330 may be determined.

At step 430, the landmarks of the prone image set 220 are correlated with the landmarks of the supine image set 210 to determine corresponding landmarks among the image sets. The correlation between landmarks exists even though the landmarks may not be located the same distance from the reference point in each image set 210, 220. The distance of the landmarks from the reference point and the distance of the landmarks from each other is then measured. The location, distance from the reference point, and distance between landmarks, for each pair of corresponding landmarks in both the prone and supine image sets 210, 220 is determined.

At step 435, once the corresponding landmarks and distances are found, the corresponding landmarks and distances are registered, along with the images in which those landmarks may be found. At step 440, the location and distances for the registered landmarks may be stored in memory.

At step 445, the location of a first indicator on a first image set is noted. In an embodiment, the user positions the first indicator on the supine 210 or prone 220 image set while the user is viewing the supine 210 or prone 220 image set. A computer may then note the position of the first indicator on the first image set, for example. The location of the indicator may be among a two, three, or four dimensional image set and the image set may be static or dynamic.

Once the first indicator on the first image set is noted, at step 450, the first indicator is forward mapped to create a one dimensional projection profile of the first indicator and the image selected. The one dimensional projection profile of the first indicator is used in step 455 to find a second indicator on a second image set which corresponds to the location of the first indicator on the first image set. For example, if a user positions the first indicator at a particular location in the supine image set 210, the corresponding location of the first indicator is located within the prone image set 220. In an embodiment, the process of matching the location of the first indicator to the location of the second indicator involves locating the corresponding landmarks and respective distances among the image sets as described above in steps 405-440.

Once the second indicator corresponding to the first indicator is located, the images or image set comprising the second indicator is inversed mapped at step 460. The images are inverse mapped from one dimensional projection profile maps into two, three, or four dimensional images using a landmark elasticity measurement and a matching method. The matching method may be among comprising the maximum correlation measure, the mutual information measure, and minimum difference measure.

Finally at step 465, a second image is displayed with an indicator corresponding to the location of the indicator on the first image. For example, a supine image set 210 and a prone image set 220 may both display the same portion of a colon with indicators identifying the same location of the colon.

Alternatively, the method 400 may display the same portion of an object, such as a colon, for example, without the indicators. Moreover, the same portion of the object, such as a colon for example, does not have to be displayed. The locations of the object displayed may be different while the indicators identify the same location of the object.

The embodiment of the invention described above is not limited to a user directing a prone image set 220. The supine image set 210 may also be directed and the prone image set 220 commanded to automatically display similar landmarks. In an embodiment, a software program may be used to display images and identify landmarks.

FIG. 5 illustrates a flow diagram for a method 500 demonstrating a method for viewing a plurality of images with corresponding landmarks. First, at step 510, two sets of images are obtained. Next, the image sets are synchronized at step 520. At step 530, a first indicator is directed to be displayed on a first image. At step 540, a corresponding location of the first indicator is located in a second image set. Finally, at step 550, a second image with an indicator corresponding to the location of the indicator in the first image is displayed. Each of these steps will be developed more fully below.

In an embodiment, the method 500 may be used in viewing multiple images with corresponding landmarks among a prone and a supine computed tomography colonography (CTC) scan. As previously discussed, in a CTC scan, two sets of images of the human colon are acquired, a prone set of images and a supine set of images.

In an embodiment, at step 510, the first image set 103 may be a supine image set 210 and the second image set 107 may be a prone image set 220. At step 520, once the prone and supine image sets 210, 220 are acquired, the image sets 210, 220 are processed as previously described, in order to synchronize corresponding landmarks.

At step 530, a user or software program directs a first image from the first image set 103 to be displayed. As an example, the first image may be a portion of the colon as viewed in the supine image set 210. A user or software program may also direct an indicator on the first image to identify a particular location on the first image. The indicator is then displayed on the image.

At step 540, the corresponding image and indicator within the second image set 107 is located. For example, if a user positions the first indicator at a particular location in the supine image set 210, the corresponding location of the first indicator is located within the prone image set 220. In an embodiment, the process of matching the location of the first indicator to the location of the second indicator involves locating the corresponding landmarks and respective distances among the image sets.

At set 550, a second image is displayed. The second displayed image has landmarks and indicators corresponding to landmarks and indicators in the first displayed image. Hence, the first displayed image and the second displayed image should correspond to the same location of the colon, but as seen from two separate views, a prone view and a supine view, for example. Moreover, the first indicator and second indicator should correspond to the same location of the object.

The method 500 may be repeated to view different areas of the colon or other object being imaged. Moreover, the method 500 is not limited to viewing the colon with two image sets. The method 500 may be used to view any number of image sets of any object.

In an embodiment, the registration of prone and supine data sets may be used in conjunction with other data operations to identify and suppress stool particles in virtual dissection images. For example, the registration of prone and supine data sets may be used in conjunction with shape classification operations as described in parent United States Patent Application Publication No. 2005/0244042 (application Ser. No. 10/709,355) which is hereby incorporated by reference in its entirety. Additionally, mapping the shape classification operation results onto a prone and supine virtual dissected space as described in parent United States Patent Application Publication No. 2005/0152587 (application Ser. No. 10/756,872) which is hereby incorporated by reference in its entirety, may be used. Moreover, suppressing identified stool particles as described in parent United States Patent Application Publication No. 2005/0256399 (application Ser. No. 10/844,073), is hereby incorporated by reference in its entirety, may be used.

FIG. 6 illustrates the difficulties of distinguishing polyps from stool in prone and supine virtual dissection images. FIG. 6 shows an image 600 illustrating a supine virtually dissected view of a human colon 610 and a prone virtually dissected view of a human colon 620. Identified in the image 600 is a first anatomical reference point T(n) 630, a second anatomical reference point T(n+1) 640, a stool particle 660, and a polyp 650. As illustrated by the image 600, the stool particle 660 and the polyp 650 have similar shapes. Accordingly, it may be difficult for a human user and/or computer program to distinguish a stool particle from a polyp. The difficulty in distinguishing a stool particle from a polyp may cause a high rate of false positives in an effort to diagnose colon cancer.

One property of stool particles that may help a human user and/or computer program distinguish a stool particle from a polyp is the ability of a stool particle to "move" between a prone scan and a supine scan. For example, a polyp tends to stay in the same location in both the supine and prone views. A stool particle, in contrast, tends to change locations between a supine and prone view. For example, in image 600, the stool particle 660 in the supine virtual dissection 610 is in a different location than the stool particle 660 in the prone virtual dissection 620. The location of the stool particle 660 in both the supine 610 and prone 620 virtual dissections may be determined by comparing the stool particle location to anatomical reference points T(n) 630 and T(n+1) 640. As is illustrated in the image 600, the stool particle 660 has "moved" closer to anatomical reference point T(n) 630 when comparing the supine virtual dissection 610 to prone virtual dissection 620. The polyp 650, however, is generally in the same location in both the supine 610 and prone 620 virtual dissections. In an embodiment of the invention, if a shape "moves" more than a threshold distance within the region defined by anatomical reference points T(n) 630 and T(n+1) 640, the shape is classified as stool and may be removed from the virtual dissection.

FIG. 7 illustrates a flow diagram for a method 700 for identifying and subtracting stool particles from virtual dissection images of a prone and supine data set in accordance with an embodiment of the present invention. At step 705, the data sets for a colon prone scan and a colon supine scan of a patient are acquired. In an embodiment, the data sets for the colon prone scan and colon supine scan of a patient are of a prepped, or cleansed colon. At step 710, the prone and supine data sets are three-dimensional filtered to determine a shape classification for a segmented colon. The three-dimensional filtering to determine a shape classification may be performed as described in parent United States Patent Application Publication no. 2005/0244042 (application Ser. No. 10/709,355), which is hereby incorporated by reference in its entirety. At step 715, the results of the shape classification may be mapped onto a prone virtual dissection image and a supine virtual dissection image as described in parent United States Patent Application Publication no. 2005/0152587 (application Ser. No. 10/756,872) which is hereby incorporated by reference in its entirety. At step 720, the prone data set and the supine data set may be registered using one-dimensional registration as described above and as part of parent United States Patent Application Publication no. 2005/0094858 (application Ser. No. 10/698,701), which is hereby incorporated by reference in its entirety.

At step 725, the shapes are localized based on the shape classification and the registration for the prone virtual dissection and the supine virtual dissection. The shapes may be localized by identifying anatomical reference points. For example, in image 600, the anatomical reference point 630 and anatomical reference point 640 are endpoints for the shapes labeled as polyp 650 and stool 660. In an embodiment, localization of the shapes 650 and 660 identifies the shapes 650 and 660 as located between anatomical reference points 630 and 640.

At step 730, a distance metric is applied to the localized shapes to identify stool particles. The stool particles may be identified by determining if the change in location of the localized shapes from the supine virtual dissection image to the prone virtual dissection image is greater than a threshold value. For example, in FIG. 6, the stool particle 660 changes location with respect to the anatomical reference points 630 and 640 when the location of the stool 660 is compared in the supine virtual dissection image 610 and the prone virtual dissection image 620. If the change in location between the virtual dissection images 610 and 620 is greater than a threshold value, the particle is classified as stool. In an embodiment, the threshold value may be determined by computing the elastic displacement of the colon between a prone image and a supine image. Particles displaced greater than the elastic displacement of the colon may be considered stool.

At step 735, the identified stool particles are suppressed. The suppressing of the identified stool particles may be performed as described in United States Patent Application Publication no. 2005/0256399 (application Ser. No. 10/844,073), which is hereby incorporated by reference in its entirety. Finally, at step 740, the prone virtual dissected image and a supine virtual dissected image, having stool particles suppressed, may be displayed.

The system and method described above may be carried out as part of a computer-readable storage medium including a set of instructions for a computer. The set of instructions includes an accessing routine for accessing a prone data set and a supine data set. The set of instructions also includes a three-dimensional filtering routine for three-dimensional filtering of a prone data set and a supine data set to determine a shape classification for a segmented colon. The set of instructions also includes a mapping routine for mapping the shape classification onto a prone virtual dissection image and a supine virtual dissection image. The set of instructions also includes a registration routine for registering the prone data set and the supine data set using one-dimensional registration to determine a registration. The set of instructions also includes a localization routine for localizing shapes based on the shape classification and the registration for the prone virtual dissection and the supine virtual dissection. The localizing routine may include localizing shapes indicative of anatomical landmarks in the colon. The set of instructions also includes a distance metric routine for applying a distance metric to the localized shapes to identify stool particles. The set of instructions also includes a suppression routine for suppressing identified stool particles. The set of instructions also includes a display routine for displaying a prone virtual dissected image and a supine virtual dissected image.

Certain embodiments may be used to view and compare multiple images of a variety of objects. For example, certain embodiments may be used to synchronize different image views of luggage or a container. Certain embodiments provide a system and method for automatic image processing of multiple images and multiple views of an object. Certain embodiments of the present invention provide a system and method for synchronizing corresponding locations among multiple images of an object.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method for identifying stool particles in virtual dissection data for a colon, said method comprising:
   three-dimensional filtering of a prone data set and a supine data set to determine a shape classification for a segmented colon;
   mapping said shape classification onto a prone virtual dissection image and a supine virtual dissection image;
   registering the prone data set and the supine data set using one-dimensional registration to determine a registration;
   localizing shapes based on said shape classification and said registration for the prone virtual dissection and the supine virtual dissection; and
   applying a distance metric to said localized shapes to identify stool particles.

2. The method of claim 1, wherein the colon is cleansed.

3. The method of claim 1, wherein said three-dimensional filtering may be performed using a Curvature tensor filter.

4. The method of claim 1, wherein the results of said three-dimensional filtering are a description of local shape characteristics.

5. The method of claim 1, said step of localizing shapes includes localizing shapes indicative of anatomical landmarks in the colon.

6. The method of claim 5, wherein said distance metric includes determining the distance between the location of a spherical shape in the prone virtual dissection image and the corresponding location of the spherical shape in the supine virtual dissection image with reference to the localization.

7. The method of claim 6, wherein if said distance between the location of a spherical shape in the prone virtual dissection image and the corresponding location of the spherical shape in the supine virtual dissection image is greater than a predetermined threshold value, classifying the spherical shape as stool.

8. The method of claim 1, further comprising the step of suppressing identified stool particles.

9. The method of claim 1, further comprising displaying a prone virtual dissected image and a supine virtual dissected image, said views having stool particles suppressed.

10. A method for suppressing stool particles in virtual data for a colon, said method comprising:
    accessing a prone data set and a supine data set;
    three-dimensional filtering of a prone data set and a supine data set to determine a shape classification for a segmented colon;
    mapping said shape classification onto a prone virtual dissection image and a supine virtual dissection image;
    registering the prone data set and the supine data set using one-dimensional registration to determine a registration;
    localizing shapes based on said shape classification and said registration for the prone virtual dissection and the supine virtual dissection;
    applying a distance metric to said localized shapes to identify stool particles;
    suppressing said identified stool particles; and
    displaying a prone virtual dissected image and a supine virtual dissected image.

11. The method of claim 10, wherein the colon is cleansed.

12. The method of claim 10, wherein said three-dimensional filtering may be performed using a Curvature tensor filter.

13. The method of claim 10, wherein the results of said three-dimensional filtering are a description of local shape characteristics.

14. The method of claim 10, said step of localizing shapes includes localizing shapes indicative of anatomical landmarks in the colon.

15. The method of claim 14, wherein said distance metric includes determining the distance between the location of a spherical shape in the prone virtual dissection image and the corresponding location of the spherical shape in the supine virtual dissection image with reference to the localization.

16. The method of claim 15, wherein if said distance between the location of a spherical shape in the prone virtual dissection image and the corresponding location of the spherical shape in the supine virtual dissection image is greater than a predetermined threshold value, classifying the spherical shape as stool.

17. A computer executable program "stored on a computer readable medium" for identifying stool particles in virtual data for a colon, said program comprising:
    a filtering routine for three-dimensional filtering of a prone data set and a supine data set to determine a shape classification for a segmented colon;
    a mapping routine for mapping said shape classification onto a prone virtual dissection image and a supine virtual dissection image;
    a registering routine registering the prone data set and the supine data set using one-dimensional registration to determine a registration;
    a localizing routine for localizing shapes based on said shape classification and said registration for the prone virtual dissection and the supine virtual dissection; and
    a distance metric routine for applying a distance metric to said localized shapes to identify stool particles.

18. The computer program of claim 17, further comprising a suppression routine for suppressing identified stool particles.

19. The computer program of claim 17, further comprising a display routine for displaying a prone virtual dissected image and a supine virtual dissected image having stool particles suppressed.

20. The computer program of claim 17, wherein said localizing routine includes localizing shapes indicative of anatomical landmarks in the colon.

* * * * *

UNITED STATES PATENT AND TRADEMARK OFFICE
CERTIFICATE OF CORRECTION

PATENT NO. : 7,574,032 B2 Page 1 of 1
APPLICATION NO. : 11/392074
DATED : August 11, 2009
INVENTOR(S) : Sirohey et al.

It is certified that error appears in the above-identified patent and that said Letters Patent is hereby corrected as shown below:

At col. 20, claim 17, line 37, delete the """
At col. 20, claim 17, line 38, delete the """

Signed and Sealed this

Sixth Day of October, 2009

David J. Kappos
*Director of the United States Patent and Trademark Office*

UNITED STATES PATENT AND TRADEMARK OFFICE
CERTIFICATE OF CORRECTION

PATENT NO. : 7,574,032 B2  Page 1 of 1
APPLICATION NO. : 11/392074
DATED : August 11, 2009
INVENTOR(S) : Sirohey et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 805 days.

Signed and Sealed this

Seventh Day of September, 2010

David J. Kappos
*Director of the United States Patent and Trademark Office*